(12) United States Patent
Duersen et al.

(10) Patent No.: US 11,685,079 B2
(45) Date of Patent: Jun. 27, 2023

(54) APPARATUS AND METHOD FOR DISPENSING AND CURING OF LIQUID MEDIA

(71) Applicant: RAMPF HOLDING GMBH & CO. KG, Grafenberg (DE)

(72) Inventors: Frank Duersen, Muensingen (DE); George Sollner, Lansing, MI (US); Juergen Penker, Commerce Township, MI (US); Utz-Volker Jackisch, Aalen (DE)

(73) Assignee: RAMPF HOLDING GMBH & CO. KG, Grafenberg (DE)

(*) Notice: Subject to any disclaimer, the term of this patent is extended or adjusted under 35 U.S.C. 154(b) by 604 days.

(21) Appl. No.: 16/628,316

(22) PCT Filed: Jul. 2, 2018

(86) PCT No.: PCT/EP2018/067830
§ 371 (c)(1),
(2) Date: Jan. 3, 2020

(87) PCT Pub. No.: WO2019/007910
PCT Pub. Date: Jan. 10, 2019

(65) Prior Publication Data
US 2020/0215813 A1 Jul. 9, 2020

(30) Foreign Application Priority Data

Jul. 3, 2017 (EP) ..................................... 17179346

(51) Int. Cl.
*B29C 31/04* (2006.01)
*B33Y 10/00* (2015.01)
(Continued)

(52) U.S. Cl.
CPC ............ *B29C 31/044* (2013.01); *B33Y 10/00* (2014.12); *B33Y 30/00* (2014.12); *B33Y 40/00* (2014.12);
(Continued)

(58) Field of Classification Search
CPC ..... B29C 64/236; B29C 64/241; B29C 39/38; B29C 39/44; B29C 31/045;
(Continued)

(56) References Cited

U.S. PATENT DOCUMENTS 3,626,838 A * 12/1971 Gorakhpurwalla .... H05B 6/784
219/699
3,715,555 A * 2/1973 Johnson .................... H01P 1/16
219/696
(Continued)

FOREIGN PATENT DOCUMENTS

DE 2508562 A1 9/1975
DE 69403375 T2 9/1997
(Continued)

OTHER PUBLICATIONS

International Search Report and Written Opinion in PCT/EP2018/067830. 9 pages. dated Sep. 25, 2018.
(Continued)

*Primary Examiner* — Leith S Shafi
*Assistant Examiner* — Inja Song
(74) *Attorney, Agent, or Firm* — Meunier Carlin & Curfman LLC

(57) ABSTRACT

The present invention relates to an apparatus for dispensing and curing of liquid media, comprising a supply system comprising at least one reservoir for the liquid medium, a nozzle for ejecting the liquid medium into a mould (10) and/or onto a workpiece and means (22) connecting the nozzle and the reservoir; and a microwave system (16,18)
(Continued)

which comprises a microwave source (16) for producing microwave radiation for irradiating the liquid medium in an irradiation zone (20) in the supply system, wherein the irradiation zone (20) is arranged between the reservoir and the nozzle. The apparatus further comprises a displacement assembly for translating and/or rotating the nozzle with respect to the mould (10) and/or the workpiece in a controlled manner. According to further aspects, the invention also relates to a system and a method for dispensing and curing of liquid media.

16 Claims, 1 Drawing Sheet

(51) Int. Cl.
| | | |
|---|---|---|
| *B33Y 30/00* | (2015.01) | |
| *B33Y 40/00* | (2020.01) | |
| *B33Y 50/02* | (2015.01) | |
| *B33Y 70/00* | (2020.01) | |
| *B29C 64/264* | (2017.01) | |
| *B29C 64/209* | (2017.01) | |
| *B29C 64/106* | (2017.01) | |
| *B29C 35/08* | (2006.01) | |

(52) U.S. Cl.
CPC .......... *B29C 64/106* (2017.08); *B29C 64/209* (2017.08); *B29C 64/264* (2017.08); *B29C 2035/0855* (2013.01); *B33Y 50/02* (2014.12); *B33Y 70/00* (2014.12)

(58) Field of Classification Search
CPC ... B29C 35/0805; B29C 39/24; B29C 31/044; B29C 64/106; B29C 64/209; B29C 64/264; B29C 2035/0855; B33Y 10/00; B33Y 30/00; B33Y 50/02; B33Y 70/00
See application file for complete search history.

(56) References Cited

U.S. PATENT DOCUMENTS

| | | | | |
|---|---|---|---|---|
| 5,471,037 | A * | 11/1995 | Goethel | C08F 2/46 204/157.43 |
| 5,719,380 | A * | 2/1998 | Coopes | H05B 6/802 219/710 |
| 5,948,194 | A * | 9/1999 | Hill | H05B 6/705 156/244.17 |
| 6,368,544 | B1 | 4/2002 | Owens | |
| 2010/0264356 | A1* | 10/2010 | Cook | B29C 35/0805 252/511 |
| 2013/0032090 | A1* | 2/2013 | Yano | B25J 9/1679 901/43 |
| 2014/0077417 | A1 | 3/2014 | Fifield et al. | |
| 2016/0254669 | A1 | 1/2016 | Zhang et al. | |
| 2016/0230283 | A1* | 8/2016 | Tseliakhovich | B29C 64/106 |
| 2017/0129183 | A1 | 5/2017 | Dufort et al. | |
| 2018/0099461 | A1* | 4/2018 | Matthews | G01R 27/2605 |

FOREIGN PATENT DOCUMENTS

| | | |
|---|---|---|
| DE | 29620154 U1 | 5/1998 |
| DE | 19647922 C2 | 3/2003 |
| EP | 0229708 B1 | 4/1991 |
| EP | 0288468 B1 | 11/1992 |
| EP | 0618057 A1 | 10/1994 |
| EP | 0696481 A1 | 2/1996 |
| EP | 1226877 A2 | 7/2002 |
| EP | 1487630 B1 | 12/2008 |
| EP | 2703074 A1 | 3/2014 |
| EP | 2851180 A1 | 3/2015 |
| GB | 2301059 A | 11/1996 |
| WO | 9419917 A1 | 9/1994 |
| WO | 9814314 A1 | 4/1998 |
| WO | 2004048463 A1 | 6/2004 |
| WO | 2015073322 A1 | 5/2015 |
| WO | 2015155745 A1 | 10/2015 |

OTHER PUBLICATIONS

Extended European search report issued in EP 1779346.6, dated Jan. 15, 2018.

* cited by examiner

APPARATUS AND METHOD FOR DISPENSING AND CURING OF LIQUID MEDIA

CROSS-REFERENCE TO RELATED APPLICATIONS

Not applicable

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable

INCORPORATION-BY-REFERENCE OF MATERIAL SUBMITTED ON A READ-ONLY OPTICAL DISC OR AS A TEXT FILE VIA THE OFFICE ELECTRONIC FILING SYSTEM

Not applicable

STATEMENT REGARDING PRIOR DISCLOSURES BY THE INVENTOR OR A JOINT INVENTOR

Background of the Invention

Field of the Invention

The present invention relates to an apparatus, a system and a method for dispensing and curing of liquid media.

Description of Related Art Including Information Disclosed Under 37 CFR 1.97 and 1.98

It is known in the art, for example from document EP 0 618 057 A1, to heat a liquid medium, in this case a reactive resin in resin transfer moulding processes, immediately before it is introduced into the mould to a temperature above the resin storage temperature, but below the catalyst activation temperature. For this purpose, the resin can be heated by microwave heating, wherein the microwave radiation is provided by a microwave source and transferred to a microwave irradiation zone by means of a waveguide.

In the apparatus known from EP 0 618 057 A1, the resin is fed into the mould from below in a vertical upwards direction and on its way into the mould passes through the stationary microwave irradiation zone which is positioned close to the single entry point for resin into the mould. As the resin enters the mould cavity only at said single entry point, it has to flow a certain distance through the mould cavity, in order to completely fill said cavity after its entry into the mould. Since the distance the resin has to travel through the mould can be substantial and since the steady curing process of the flowing resin increases its viscosity, a uniform filling of the mould cavity with the heated resin and thus a satisfactory product or workpiece quality may be hard to achieve. Also, the maximum possible size of the mould cavity and thus of the workpiece to be moulded may be limited.

BRIEF SUMMARY OF THE INVENTION

It is therefore an object of the present invention to provide an apparatus, a system and a method for dispensing and curing of liquid media, in particular reactive liquid media, more particularly reactive resins, with which the drawbacks of the prior art can be remedied and moulding processes with such liquid media can be performed efficiently, while the size and shape of the mould or workpiece remains scalable.

For this purpose, the apparatus for dispensing and curing of liquid media according to the invention comprises a supply system, in turn comprising at least one reservoir 42 for the liquid medium, a nozzle 28 for injecting the liquid medium into a mould and/or onto a workpiece and means connecting the nozzle 28 and the reservoir 42; and a microwave system, comprising a microwave source for producing microwave radiation for irradiating the liquid medium in an irradiation zone in the supply system, wherein the irradiation zone is arranged between the reservoir 42 and the nozzle 28. Furthermore, it comprises a displacement assembly for translating and/or rotating the nozzle 28 with respect to the mould and/or workpiece in a controlled manner.

While the apparatus according to the invention can on the one hand be employed with casting moulds known in the art, it has to be stated that on the other hand any desired workpiece can as well be treated with the apparatus, including substrates onto which the liquid medium is to be dispensed.

For the irradiation zone, known materials which are transparent for microwave radiation can be used as piping for the liquid medium, such as PTFE material, glass, etc. Furthermore, known technologies can be employed for the displacement assembly, such as for example worm gears or cable pulls together with rail or track assemblies, or also more complex designs such as robotic arm systems.

By providing the displacement assembly such that the nozzle is translatable and/or rotatable with respect to the mould and/or the workpiece, into/onto which the liquid medium is to be dispensed, moulds and workpieces of arbitrary dimensions and sizes may be used, as the distance which the liquid medium has to flow to fill the entire mould or to reach all parts of the workpiece to be moulded can be reduced to a minimum or otherwise controlled.

While in a basic embodiment of the present invention, it is possible to only translate and/or rotate the nozzle with respect to the mould and/or workpiece, in more sophisticated embodiments, the displacement assembly may further be arranged to displace the irradiation zone with respect to the mould and/or workpiece in a controlled manner, wherein the irradiation zone and the nozzle are preferably kept in a predetermined distance.

In such embodiments, since the irradiation zone is also translated and/or rotated with respect to the mould or the workpiece, the distance between the irradiation zone and the entry point of the liquid medium into the mould or onto the workpiece can also be minimized or otherwise controlled, which may eliminate or reduce the need for controlling the output power of the microwave source.

Also, by controlling said distance between the irradiation zone and the entry point to an optimal value at all times of the dispensing of the medium, the liquid medium can be prevented from flowing extended distances after being irradiated by the microwave radiation, so that it may become possible to increase the microwave power and temperature of the liquid medium before it is ejected from the nozzle without having to worry about a rise in viscosity of the medium. In the case of reactive resins, in certain embodiments they could even be heated in the irradiation zone to temperatures above their activation temperatures if the distance to be travelled to their final destination can be guaranteed to be sufficiently short at all times. Thus, a satisfactory quality of the moulded workpiece can be achieved over its entire size while at the same time the cycle time of the curing process itself may even be reduced. Displacing the irradiation zone together with the nozzle also allows to keep the flowing distance of the irradiated medium in the supply system before its ejection from the nozzle small, such that the amount of medium adhering to the inner walls of the supply system downstream of the irradiation zone can be minimized. Thereby the danger of clogging of the supply system can be reduced.

According to a further development, the means connecting the reservoir and the nozzle may comprise a rigid pipe, which is preferably directed in a downward direction. By employing such a rigid pipe as the means connecting the reservoir and the nozzle, a uniform flow of the liquid medium can be achieved and temperature gradients within the medium can be reduced, which in turn reduces irregular premature curing and residues in the supply system. Furthermore, in case the rigid pipe is directed in the vertical downward direction, the liquid medium may flow following the effect of gravity, which contributes to reducing the complexity of the apparatus, since it might not be necessary to employ pumping means for dispensing the medium. Alternatively or additionally, the means connecting the reservoir and the nozzle may also comprise flexible pipes and/or pipes directed in arbitrary directions, such as horizontally.

Depending on the overall geometry of the apparatus according to the invention, it may be beneficial if the microwave system further comprises a waveguide for passing microwaves from the microwave source to the irradiation zone. Employing such a waveguide allows for positioning the usually rather bulky microwave source remote from the irradiation zone, which in turn facilitates positioning the irradiation zone close to the nozzle. Alternatively, the microwave source could of course also be positioned close to the irradiation zone, such that it directly radiates the liquid medium in the irradiation zone without the use of a waveguide.

In a possible embodiment, the displacement assembly may further be arranged to displace the waveguide and/or the microwave source with respect to the mould and/or the workpiece together with the irradiation zone. This allows for a simple design of the waveguide, such as a hollow conductor made from metal. Alternatively, a fixed microwave source could be employed together with a flexible waveguide, such that the microwave source can stay in place while the irradiation zone is translated and/or rotated with respect to the mould and/or the workpiece. By using a fixed microwave source, the displacement assembly does not have to carry and translate its substantial weight and can therefore be designed smaller and possibly faster due to its reduced inertia.

While in the most basic embodiment of an apparatus according to the invention, the displacement assembly may be arranged to translate the nozzle only along a straight line or to rotate the nozzle only around a single axis, in order to be able to work with more complex moulds or workpieces, the displacement assembly may preferably be arranged to translate the nozzle with respect to the mould and/or the workpiece along at least two perpendicular directions and/or to rotate the nozzle with respect to the mould and/or the workpiece around at least two perpendicular axes.

It shall be stated that the term "two (three) perpendicular axes" does not necessarily have to mean that the displacement assembly strictly translates the nozzle along perpendicular axes but rather that it allows positioning of the nozzle in two (three) dimensions.

Particularly in embodiments, in which the nozzle is only to be translated but not to be rotated with respect to the mould and/or the workpiece, it may be beneficial if the nozzle is arranged to eject the liquid medium in a substantially vertical downward direction. This way, the liquid medium can be ejected from the nozzle following the effect of gravity, again reducing the complexity of the apparatus. Also, a vertical downward ejection of the liquid medium may simplify the correct positioning of the nozzle with respect to the mould or the workpiece, as it simply has to be positioned directly above the point to which the liquid medium is to be dispensed, such that the vertical distance between the nozzle and the mould or workpiece has less of an influence than in cases in which the medium is ejected with a horizontal component as well. However, especially in cases in which an irregularly shaped workpiece is to be treated with the liquid medium, it may be beneficial to arrange the nozzle such that it ejects the liquid medium at any suitable angle relative to the vertical direction or even strictly horizontally.

According to the invention, the apparatus may further comprise in its supply system a mixing and/or metering device, which is arranged for mixing at least one component and/or for metering the amount and/or flow rate of the medium to be ejected from the nozzle. By providing said mixing and/or metering device in the apparatus according to the invention, both the chemical as well as physical properties of the medium to be dispensed can be controlled in an optimal manner.

It is beneficial to provide the mixing and/or metering device at a position upstream and distanced from the irradiation zone by a certain amount, such that clogging of the mixing and/or metering device by irradiated medium can be reliably avoided. If such clogging would occur in the supply system between the mixing and/or metering device and the irradiation zone, the clogged component could be easily and cheaply replaced, while clogging of the mixing and/or metering device due to back pressure would lead to much more expensive and time-consuming repair or replacement work. It may therefore be preferable to position the irradiation zone as close to the nozzle as possible yet distanced from the mixing and/or metering device.

According to a further development, the section of the supply system connecting the mixing and/or metering device and the irradiation zone may be formed by a rigid pipe, which preferably extends in a vertical downward direction, so that the distance between the mixing and/or metering device remains constant at all times and the physical as well as chemical properties of the medium entering the irradiation zone from the mixing and/or metering device do not change depending on the current position of the irradiation zone. Alternatively or additionally, the section of the supply system connecting the mixing and/or metering device and the irradiation zone may also be formed by flexible pipes and/or pipes directed in arbitrary directions, such as horizontally.

The apparatus according to the invention may further comprise at least one temperature sensor for sensing the temperature of the liquid medium, optionally associated with the nozzle and/or positioned upstream and/or downstream of the irradiation zone. By using the output data of said at least one temperature sensor, other working parameters of the apparatus can be controlled, such as the moving direction and/or velocity of the displacement device, the output power of the microwave system and working parameters of the mixing and/or metering device.

For this purpose, a control unit may be provided, which is adapted to control the microwave source, the displacement assembly and the mixing and/or metering device and which receives data from the at least one temperature sensor. In apparatuses, in which a temperature sensor is not provided, the control unit may also control said other components of the apparatus based on predetermined programs and/or taking into account the output of other sensors provided with the apparatus. The control unit can be embodied by known devices such as computers and/or microcontrollers and/or can be integrated, embedded or in data communication with superordinate control systems or, generally speaking, other control devices.

According to a second aspect, the invention relates to a system for dispensing and curing of liquid media, comprising at least one mould and an apparatus according to the invention.

According to a third aspect, the invention relates to a method for dispensing and curing of liquid media, in particular reactive resins, using an apparatus according to the invention and comprising simultaneously displacing the nozzle with respect to the mould and/or the workpiece, ejecting the liquid medium from the nozzle and operating the microwave source to irradiate the liquid medium in the irradiation zone.

In case at least one temperature sensor is provided in the apparatus as discussed above, the microwave power supplied by the microwave source may be adjusted during the dispensing based on a sensed temperature of the liquid medium.

According to the invention, the liquid medium may be a chemically reactive liquid medium, particularly a reactive resin, particularly a one-component or two-component reactive system. Non-limiting examples of the liquid medium encompass liquid media which after curing result in polyurethane, epoxy, formaldehyde, etc. resins. In particular when a two-component liquid medium is used in the apparatus according to the invention, the relative positioning of the mixing and/or metering device, the irradiation zone and the nozzle is an important parameter of the apparatus design and by choosing it such that the irradiation of the medium is performed close to the nozzle yet at a distance from the mixing and/or metering device, the above mentioned prevention of clogging of expensive components can reliably be achieved.

According to a fourth aspect, the invention relates to a use of an apparatus according to the invention for forming a three-dimensional structure, e.g. in a three-dimensional printing process. Such three-dimensional (3d) printing processes have recently received attention in many industrial and scientific fields since they facilitate producing prototype workpieces as well as highly specialized and complex products from scratch by subsequently adding multiple layers of a suitable material in the desired shape with almost no restrictions concerning the design of the piece.

For such use of the apparatus according to the invention obviously no mould is required but the liquid medium is directly applied onto a workpiece in the form of a substrate in at least one layer. Due to the translational as well as rotational flexibility provided by the displacement assembly and the improved curing of the medium provided by the microwave system, the apparatus according to the invention, when used in 3d-printing processes, can achieve superior results compared with 3d-printers known in the art.

BRIEF DESCRIPTION OF THE SEVERAL VIEWS OF THE DRAWINGS

Further advantages and features of the present invention will become even clearer from the following description of an embodiment of the invention with reference to the accompanying figures, wherein.

DETAILED DESCRIPTION OF THE INVENTION

Figure 1:
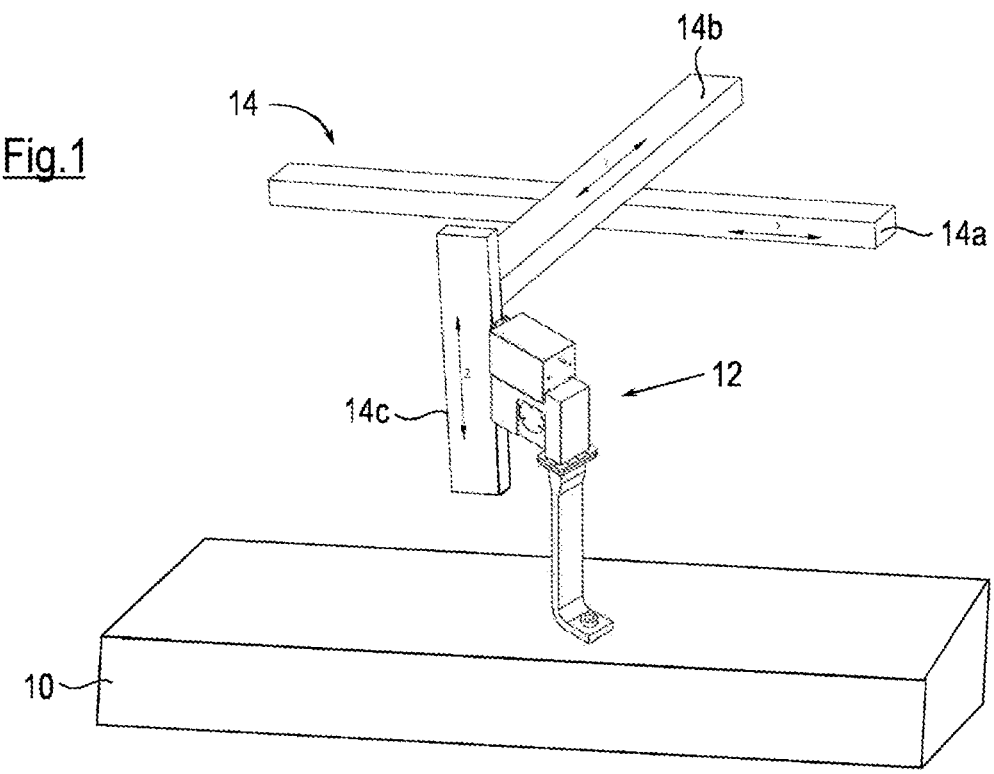
FIG. 1 is a schematic view of a system for dispensing and curing of liquid media according to the invention comprising a mould.

FIG. 1 schematically shows a system for dispensing and curing of liquid media, such as a reactive resin, according to the invention, comprising a mould 10 as well as an apparatus 12 for dispensing and curing of the liquid medium. For the sake of visibility, certain components of the apparatus 12 shown in FIG. 2 have been omitted in FIG. 1.

The apparatus 12 is installed vertically above the mould 10 and suspended from a ceiling 14 in a translatable manner by means of a displacement assembly (only schematically shown) along three perpendicular directions X, Y and Z, such that it can be positioned above each point of the mould 10 with a controllable distance in the vertical direction. The displacement assembly comprises three orthogonal rails systems 14a, 14b and 14c along which the movable parts of the apparatus can be moved in X-, Y- and Z-directions The translation along the X-, Y- and Z-directions can for example be driven by cable pull devices which are in turn driven by electric motors and controlled by a control unit 44.

Figure 2:
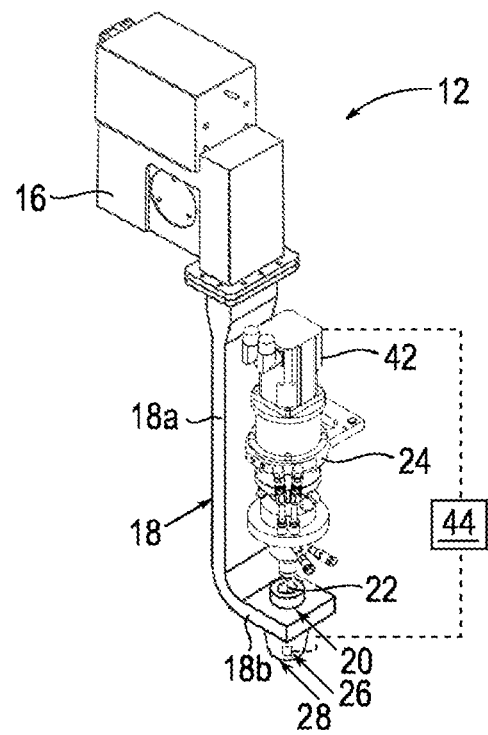
FIG. 2 is an enlarged side view of the components of FIG. 1, which are translated by the displacement assembly.

In FIG. 2, the apparatus 12 shown in FIG. 1 is again shown in an enlarged view. It comprises a microwave source 16, which is from a known type, such as e.g. a magnetron. The microwaves produced by the microwave source 16 are coupled into and transferred through a waveguide 18, which is formed as a metallic hollow conductor and comprises a vertical section 18a extending from the microwave source 16 in a vertical downward direction until it turns near its end opposed to the microwave source 16 into a horizontal section 18b.

In said horizontal section 18b, an irradiation zone 20 is provided, such that an aperture extends through the waveguide 18 in a vertical direction in a suitable position taking into account the propagation properties of the geometry of the waveguide and the wavelength provided by the microwave source 16.

A section of a rigid pipe 22 made from a material which is transparent for the microwave radiation produced by the microwave source 16, such as a PTFE material, is guided through the waveguide 18 extending through said aperture and thus through the horizontal section 18b of the waveguide 18.

When the apparatus 12 is in use, a liquid medium, such as a reactive resin, which is supplied from a mixing and metering device 24 is flowing through said rigid pipe 22. The mixing and metering device 24 is positioned horizontally above the irradiation zone 20 and together with the displacement assembly and the microwave source is controlled by the above-mentioned control unit 44 in order to mix components of the liquid medium and meter the output of the medium to a desired flow rate. Since the mixing and metering device 24 is positioned vertically above the irradiation zone 20 and thus the mould 10 (see FIG. 1), the flow of the medium from the mixing and metering device 24 through the pipe 22 into the mould 10 may be driven solely by the effect of gravity.

Below the irradiation zone 20, a nozzle 28 is provided, by means of which the irradiated liquid medium is dispensed from the apparatus 12 into the mould 10.

Since all components of the apparatus 12, including the microwave source 16, the wave guide 18, the nozzle, the irradiation zone 20 and the mixing and metering device 24 are translatable with respect to the mould by means of the displacement assembly, the distance between the irradiation zone 20 and the mould 10 can be kept at a desired constant value while the nozzle is moved along the mould in X and Y directions, such that the liquid medium can enter the mould at each point and at all times with substantially the same temperature and same chemical and physical properties. In order to allow a feedback control, the apparatus 12 may further be provided with at least one temperature sensor 26 for the liquid medium at a suitable position which delivers data to the control unit 44 on the basis of which the output of microwave power by the microwave source 16 can be controlled.

The invention claimed is:

1. An apparatus for dispensing and curing of a liquid medium, comprising:
    a supply system comprising at least one reservoir for the liquid medium, a nozzle for ejecting the liquid medium into a mould and/or onto a workpiece and a rigid pipe connecting the nozzle and the reservoir; and
    a microwave system which comprises a microwave source for producing microwave radiation for irradiating the liquid medium in an irradiation zone in the supply system, wherein the irradiation zone is arranged between the reservoir and the nozzle, wherein the microwave system further comprises a waveguide for passing microwaves from the microwave source to the irradiation zone;
    wherein the apparatus further comprises a displacement assembly for translating and/or rotating the nozzle with respect to the mould and/or the workpiece in a controlled manner,
    wherein the displacement assembly is further arranged to displace the irradiation zone with respect to the mould and/or workpiece in a controlled manner,
    wherein the displacement assembly is further arranged to displace the waveguide and/or the microwave source with respect to the mould and/or the workpiece together with the irradiation zone,
    wherein the displacement assembly comprises worm gears or cable pulls together with rail or track assemblies or robotic arm systems, and
    wherein the waveguide couples the irradiation zone to the displacement assembly.

2. The apparatus according to claim 1, wherein the displacement assembly is arranged to translate the nozzle with respect to the mould and/or the workpiece along at least two perpendicular directions and/or to rotate the nozzle with respect to the mould and/or the workpiece around at least two perpendicular axes.

3. The apparatus according to claim 1, wherein the nozzle is arranged to eject the liquid medium in a substantially vertical downward direction.

4. The apparatus according to claim 1, wherein the irradiation zone and the nozzle are kept a predetermined distance from each other.

5. The apparatus according to claim 1, wherein the rigid pipe is directed in a downward direction.

6. The apparatus according to claim 1, wherein the supply system further comprises a mixing and/or metering device, which is arranged for mixing at least one component and/or for metering an amount and/or a flow rate of the medium to be ejected from the nozzle.

7. The apparatus according to claim 6, wherein a section of the supply system connecting the mixing and/or metering device and the irradiation zone is formed by the rigid pipe, which extends in a vertical downward direction.

8. The apparatus according to claim 1, wherein the apparatus further comprises at least one temperature sensor for sensing the temperature of the liquid medium.

9. The apparatus according to claim 8, wherein the apparatus further comprises a control unit which is adapted to control the microwave source, the displacement assembly, and a mixing and/or metering device and which receives data from the at least one temperature sensor.

10. The apparatus of claim 8, wherein the at least one temperature sensor is associated with the nozzle and/or positioned upstream and/or downstream of the irradiation zone.

11. A system for dispensing and curing of liquid media, comprising at least one mould and the apparatus according to claim 1.

12. A method for dispensing and curing of liquid media, the method comprising: providing the apparatus according to claim 1 and simultaneously displacing the nozzle with respect to the mould and/or the workpiece, ejecting the liquid medium from the nozzle, and operating the microwave source to irradiate the liquid medium in the irradiation zone.

13. The method according to claim 12, wherein during the ejecting the microwave power supplied by the microwave source is adjusted based on a sensed temperature of the liquid medium.

14. The method according to claim 12 wherein the liquid medium is a chemically reactive liquid medium.

15. The method of claim 14, wherein the liquid medium is a reactive resin, wherein the reactive resin is a one-component or a two-component reactive system.

16. A method of forming a three-dimensional (3D) structure, comprising: printing the 3D structure using the apparatus according to claim 1.

* * * * *